T. E. MURRAY, Jr., AND J. B. MURRAY.
METAL INCASED TUBE AND METHOD OF PRODUCING THE SAME.
APPLICATION FILED OCT. 8, 1919.

1,333,275.

Patented Mar. 9, 1920.

Inventors
Thomas E. Murray Jr
Joseph B. Murray
By
Attorney

UNITED STATES PATENT OFFICE.

THOMAS E. MURRAY, JR., AND JOSEPH B. MURRAY, OF BROOKLYN, NEW YORK.

METAL-INCASED TUBE AND METHOD OF PRODUCING THE SAME.

1,333,275.   Specification of Letters Patent.   Patented Mar. 9, 1920.

Application filed October 8, 1919. Serial No. 329,355.

*To all whom it may concern:*

Be it known that we, THOMAS E. MURRAY, Jr., and JOSEPH B. MURRAY, citizens of the United States, residing at Brooklyn, in the county of Kings and State of New York, have invented a certain new and useful Improvement in Metal-Incased Tubes and Methods of Producing the Same, of which the following is a specification.

The invention relates to a tube having a metal casing and to a method of producing the same. The tube is retained from displacement within the preferably polygonal casing by frictional contact with the inner surface of said casing at a plurality of places. The casing is formed in two longitudinal sections of sheet metal which, after the tube is introduced, are united by electrical welding.

In the accompanying drawing—

Figure 1:
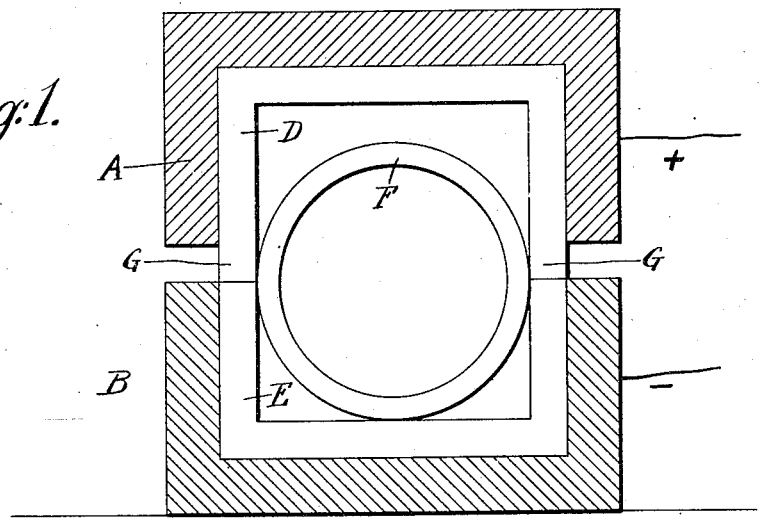
Figure 2:
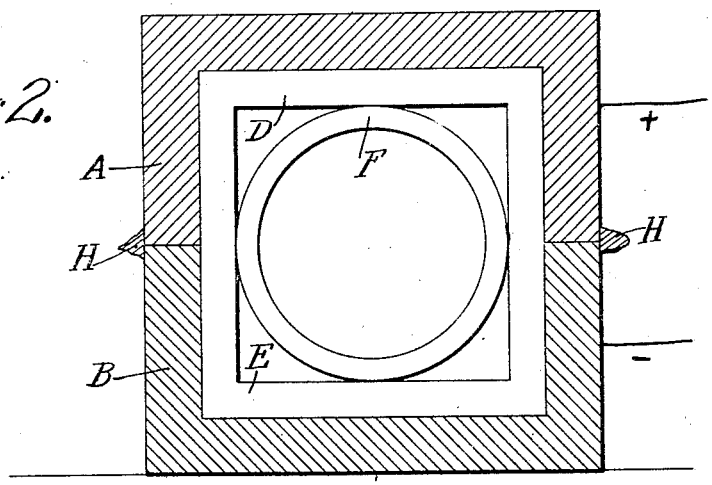

Figure 1 is an end view of the casing and the tube therein—the said casing being disposed in recesses of the electrodes shown in cross section. The parts in this figure are in position for welding. Fig. 2 is a similar view, showing the position of the parts after the welding is completed.

Similar letters of reference indicate like parts.

The electrodes A, B are of elongated box shape rectangular in cross section. The electrode A, which is here movable with respect to electrode B, is inverted and placed over electrode B. Seated in said electrodes are the two parts D and E of the metal casing. The cylindrical tube F is of such diameter as to fit tightly within the casing, so as to be held therein against displacement without necessary recourse to other means than the frictional resistance between its outer surface and the inner surface of said casing at the places where contact of said outer and inner surfaces is established.

As here shown, the upper part D of the casing is provided with take-ups G which before the weld is made extend into the space between the separated electrodes A, B, as shown in Fig. 1. The said take-ups are of such length as that when the movable electrode A is forced downward during the welding, said take-ups will become fused, the metal thereof extruded, and the inner surface of the upper wall of said casing will meet the top of the tube, as shown in Fig. 2.

The operation is as follows: The tube F is placed within the lower part E of the casing, sufficient pressure being used to force it into close contact with the bottom and side walls of said part. The upper part D of the casing, which is seated in the upper electrode A, is then moved downwardly with said electrode, so that the take-ups meet the upper edge of the lower part E of the casing, and the upper part of the tube enters the part D. The welding current being established, the upper electrode A is forced downwardly, the take-ups G meanwhile fusing and the metal thereof becoming extruded chiefly on the outside of said electrodes, as shown at H, Fig. 2. As the take-ups disappear, the descending side walls of the upper part D of the casing bind closely against the tube, and finally the upper wall of the upper part of the casing meets, as already stated and as shown in Fig. 2, the top of said tube. The operation is then finished, leaving the tube at four places ninety degrees apart in close frictional contact with the inner surface of the casing, the parts of which have become united by the weld.

While some of the extruded metal of the take-ups may flow inwardly between tube and casing, it is obvious that by reason of the closeness of contact between tube and casing at the joint, but very little can do so, and upon this no reliance need be placed for holding the tube in position, since the frictional contact of tube and casing abundantly serves that purpose. In fact the tube may be of metal or material to which the fused metal of the casing will not unite or effectively adhere. We may make the tube, for example, of fictile refractory material, such as cement or terra cotta, or of brass or copper, the casing being of iron or steel—or indeed of any suitable substance which will withstand the momentary high heat of the weld and the pressure required to insure close contact of tube and casing.

We have here shown the take-ups G on the upper part D of the casing, but, as is well known in welding practice, they may be formed upon the lower part E or distributed on both of said parts.

We claim:

1. The method of inclosing a tube in a metal casing of polygonal cross section, which consists in first, forming the casing in two longitudinal half sections of such dimensions as that the tube will fit therein, second, placing the tube in said sections, and third, electrically welding said sections together at their registering edges.

2. The method of inclosing a tube in a metal casing of polygonal cross section, which consists in first, forming the casing in two longitudinal half sections of such dimensions as that the tube will fit tightly therein, second, placing said tube in one of said casing sections, third, placing the other of said casing sections inverted upon said tube, and fourth, forcing said casing sections together and simultaneously establishing the welding current at the joint between said sections.

3. A tube and a metal casing therefor, the said tube being of a cross section different from that of said casing and held against displacement within said casing by frictional contact therewith at a plurality of separated places.

4. A tube and metal casing, as in claim 3, the said tube being of a material different from that of said casing.

5. A tube and metal casing, as in claim 3, the said casing being of polygonal and the said tube of circular cross section.

6. A tube and metal casing, as in claim 3, the said casing being formed in two longitudinal sections integrally united by electrical welding.

In testimony whereof we have affixed our signatures in presence of two witnesses.

THOMAS E. MURRAY, Jr.
JOSEPH B. MURRAY.

Witnesses:
GERTRUDE T. PORTER,
MAY T. McGARRY.